US012747757B2

(12) United States Patent
Kiefer, IV

(10) Patent No.: US 12,747,757 B2
(45) Date of Patent: Sep. 29, 2026

(54) BEARING COMPONENT WITH PIEZOELECTRIC CORE

(71) Applicant: The Timken Company, North Canton, OH (US)

(72) Inventor: Louis Kiefer, IV, New London, NH (US)

(73) Assignee: The Timken Company, North Canton, OH (US)

( * ) Notice: Subject to any disclaimer, the term of this patent is extended or adjusted under 35 U.S.C. 154(b) by 92 days.

(21) Appl. No.: 18/839,838

(22) PCT Filed: Nov. 14, 2022

(86) PCT No.: PCT/US2022/079795

§ 371 (c)(1),
(2) Date: Aug. 20, 2024

(87) PCT Pub. No.: WO2023/163803

PCT Pub. Date: Aug. 31, 2023

(65) Prior Publication Data

US 2025/0154987 A1 May 15, 2025

Related U.S. Application Data

(60) Provisional application No. 63/314,165, filed on Feb. 25, 2022.

(51) Int. Cl.

*F16C 41/00* (2006.01)
*F16C 33/58* (2006.01)
*H02N 2/18* (2006.01)

(52) U.S. Cl.

CPC ............ *F16C 41/00* (2013.01); *F16C 33/586* (2013.01); *H02N 2/186* (2013.01); *F16C 2202/36* (2013.01)

(58) Field of Classification Search

CPC ........ F16C 33/58; F16C 33/586; F16C 41/00; F16C 41/004; F16C 2202/36; H02N 2/186; H10N 30/30
See application file for complete search history.

(56) References Cited

U.S. PATENT DOCUMENTS 5,485,053 A 1/1996 Baz
5,677,488 A 10/1997 Monahan et al.
(Continued)

FOREIGN PATENT DOCUMENTS

CH 710837 A1 9/2016
CN 201818658 U 5/2011
(Continued)

OTHER PUBLICATIONS

International Search Report and Written Opinion for Application No. PCT/US2022/079795 dated Mar. 3, 2023 (10 pages).
(Continued)

*Primary Examiner* — Alan B Waits
(74) *Attorney, Agent, or Firm* — Michael Best & Friedrich LLP

(57) ABSTRACT

A bearing component includes an internal core of piezoelectric material for harvesting mechanical energy. The bearing component has the internal core of piezoelectric material extending circumferentially about an entirety of the bearing component, an insulating layer surrounding the internal core of piezoelectric material, and an external shell surrounding the insulating layer and enclosing the internal core of piezoelectric material and the insulating layer. One arrangement includes a p-type material and an n-type material contacting opposing portions of the internal core of piezoelectric material to act as an internal power generation mechanism that is isolated from the external shell of the bearing component by an insulating layer. Another arrangement includes an inner alpha layer surrounding the internal
(Continued)

core of piezoelectric material, a beta layer surrounding the inner alpha layer, and a gamma layer surrounding the beta layer and in contact with the insulating layer.

22 Claims, 8 Drawing Sheets

(56) References Cited

U.S. PATENT DOCUMENTS

| | | | | |
|---|---|---|---|---|
| 10,243,136 | B2 | 3/2019 | Ghanbari et al. | |
| 10,777,732 | B2 | 9/2020 | Benedict et al. | |
| 11,027,519 | B2 | 6/2021 | Lee et al. | |
| 2011/0150372 | A1 | 6/2011 | Care et al. | |
| 2012/0049679 | A1 | 3/2012 | Petrenko et al. | |
| 2013/0328967 | A1 | 12/2013 | Miyazawa | |
| 2015/0043858 | A1 | 2/2015 | Aust et al. | |
| 2015/0138713 | A1 | 5/2015 | Onda | |
| 2016/0256971 | A1 | 9/2016 | Ting et al. | |
| 2017/0292610 | A1 | 10/2017 | Lee et al. | |
| 2019/0032710 | A1 | 1/2019 | Campbell et al. | |
| 2019/0107153 | A1 | 4/2019 | Ueda et al. | |
| 2019/0178295 | A1 | 6/2019 | Hebrard | |
| 2019/0189899 | A1 | 6/2019 | Sieber et al. | |
| 2019/0189904 | A1 | 6/2019 | Benedict et al. | |
| 2019/0322133 | A1 | 10/2019 | Lamboglia | |
| 2019/0360357 | A1 | 11/2019 | Aguilar et al. | |
| 2020/0191017 | A1 | 6/2020 | Digoude et al. | |
| 2020/0271545 | A1 | 8/2020 | Lee et al. | |
| 2020/0338757 | A1 | 10/2020 | Iwazaki et al. | |
| 2021/0213186 | A1 | 7/2021 | Michelena et al. | |
| 2023/0022535 | A1* | 1/2023 | Griswold ................. | H02N 2/18 |

FOREIGN PATENT DOCUMENTS

| | | | |
|---|---|---|---|
| CN | 102242769 | A | 11/2011 |
| CN | 102278372 | A | 12/2011 |
| CN | 102278379 | A | 12/2011 |
| CN | 102588435 | A | 7/2012 |
| CN | 102937137 | A | 2/2013 |
| CN | 103075420 | A | 5/2013 |
| CN | 103075421 | A | 5/2013 |
| CN | 202946532 | U | 5/2013 |
| CN | 103291751 | A | 9/2013 |
| CN | 203230733 | U | 10/2013 |
| CN | 103410856 | A | 11/2013 |
| CN | 103671471 | A | 3/2014 |
| CN | 103836070 | A | 6/2014 |
| CN | 103912573 | A | 7/2014 |
| CN | 203730538 | U | 7/2014 |
| CN | 103967942 | A | 8/2014 |
| CN | 103973162 | A | 8/2014 |
| CN | 103982539 | A | 8/2014 |
| CN | 103982540 | A | 8/2014 |
| CN | 103982541 | A | 8/2014 |
| CN | 103982542 | A | 8/2014 |
| CN | 103982543 | A | 8/2014 |
| CN | 103982556 | A | 8/2014 |
| CN | 103982557 | A | 8/2014 |
| CN | 103986370 | A | 8/2014 |
| CN | 103994142 | A | 8/2014 |
| CN | 103994144 | A | 8/2014 |
| CN | 203856882 | U | 10/2014 |
| CN | 203856883 | U | 10/2014 |
| CN | 203856886 | U | 10/2014 |
| CN | 203856887 | U | 10/2014 |
| CN | 203856888 | U | 10/2014 |
| CN | 203856889 | U | 10/2014 |
| CN | 203856902 | U | 10/2014 |
| CN | 203856903 | U | 10/2014 |
| CN | 203856904 | U | 10/2014 |
| CN | 203859706 | U | 10/2014 |
| CN | 203859707 | U | 10/2014 |
| CN | 203906539 | U | 10/2014 |
| CN | 203926388 | U | 11/2014 |
| CN | 203926389 | U | 11/2014 |
| CN | 203962683 | U | 11/2014 |
| CN | 104214219 | A | 12/2014 |
| CN | 204061540 | U | 12/2014 |
| CN | 104265762 | A | 1/2015 |
| CN | 204099414 | U | 1/2015 |
| CN | 104454986 | A | 3/2015 |
| CN | 104482041 | A | 4/2015 |
| CN | 104613090 | A | 5/2015 |
| CN | 104632878 | A | 5/2015 |
| CN | 204327759 | U | 5/2015 |
| CN | 104675859 | A | 6/2015 |
| CN | 204403145 | U | 6/2015 |
| CN | 204403146 | U | 6/2015 |
| CN | 204419850 | U | 6/2015 |
| CN | 204419888 | U | 6/2015 |
| CN | 104835907 | A | 8/2015 |
| CN | 104912918 | A | 9/2015 |
| CN | 104912926 | A | 9/2015 |
| CN | 104948577 | A | 9/2015 |
| CN | 104948581 | A | 9/2015 |
| CN | 104976224 | A | 10/2015 |
| CN | 105003530 | A | 10/2015 |
| CN | 105041850 | A | 11/2015 |
| CN | 204805321 | U | 11/2015 |
| CN | 204805324 | U | 11/2015 |
| CN | 204805325 | U | 11/2015 |
| CN | 204805326 | U | 11/2015 |
| CN | 204805330 | U | 11/2015 |
| CN | 204805331 | U | 11/2015 |
| CN | 204805332 | U | 11/2015 |
| CN | 204805335 | U | 11/2015 |
| CN | 105179469 | A | 12/2015 |
| CN | 105179470 | A | 12/2015 |
| CN | 105179476 | A | 12/2015 |
| CN | 204828290 | U | 12/2015 |
| CN | 204878309 | U | 12/2015 |
| CN | 105305879 | A | 2/2016 |
| CN | 105333004 | A | 2/2016 |
| CN | 205064770 | U | 3/2016 |
| CN | 106374777 | A | 2/2017 |
| CN | 106441676 | A | 2/2017 |
| CN | 106523523 | A | 3/2017 |
| CN | 106763149 | A | 5/2017 |
| CN | 106884870 | A | 6/2017 |
| CN | 107152456 | A | 9/2017 |
| CN | 107192555 | A | 9/2017 |
| CN | 107269697 | A | 10/2017 |
| CN | 108223574 | A | 6/2018 |
| CN | 207609685 | U | 7/2018 |
| CN | 108533618 | A | 9/2018 |
| CN | 108612756 | A | 10/2018 |
| CN | 108712105 | A | 10/2018 |
| CN | 108896307 | A | 11/2018 |
| CN | 109185334 | A | 1/2019 |
| CN | 109356936 | A | 2/2019 |
| CN | 109356960 | A | 2/2019 |
| CN | 109780056 | A | 5/2019 |
| CN | 109812501 | A | 5/2019 |
| CN | 109812504 | A | 5/2019 |
| CN | 110081074 | A | 8/2019 |
| CN | 110094413 | A | 8/2019 |
| CN | 110145536 | A | 8/2019 |
| CN | 110185909 | A | 8/2019 |
| CN | 110332231 | A | 10/2019 |
| CN | 110364221 | A | 10/2019 |
| CN | 110513395 | A | 11/2019 |
| CN | 110985542 | A | 4/2020 |
| CN | 111306188 | A | 6/2020 |
| CN | 111442030 | A | 7/2020 |
| CN | 111457007 | A | 7/2020 |
| CN | 111577755 | A | 8/2020 |
| CN | 211314852 | U | 8/2020 |
| CN | 111623983 | A | 9/2020 |
| CN | 111664368 | A | 9/2020 |
| CN | 111720442 | A | 9/2020 |
| CN | 111749979 | A | 10/2020 |
| CN | 112228465 | A | 1/2021 |
| CN | 112253634 | A | 1/2021 |

(56) References Cited

FOREIGN PATENT DOCUMENTS

| | | | | |
|---|---|---|---|---|
| CN | 112431855 | A | 3/2021 | |
| CN | 112483539 | A | 3/2021 | |
| CN | 212838937 | U | 3/2021 | |
| CN | 110474559 | B | 4/2021 | |
| CN | 112727926 | A | 4/2021 | |
| CN | 112780678 | A | 5/2021 | |
| CN | 112904551 | A | 6/2021 | |
| CN | 112943792 | A | 6/2021 | |
| CN | 112943795 | A | 6/2021 | |
| CN | 113187816 | A | 7/2021 | |
| CN | 213808500 | U | 7/2021 | |
| CN | 113236671 | A | 8/2021 | |
| DE | 102010015207 | A1 | 10/2011 | |
| DE | 102010025523 | A1 | 12/2011 | |
| DE | 102010039167 | A1 | 2/2012 | |
| DE | 102010035265 | A1 | 3/2012 | |
| DE | 102010054455 | A1 | 6/2012 | |
| DE | 102011003591 | A1 | 8/2012 | |
| DE | 102011005360 | A1 | 9/2012 | |
| DE | 102011006907 | A1 | 10/2012 | |
| DE | 202013100940 | U1 | 4/2013 | |
| DE | 102011120095 | A1 | 6/2013 | |
| DE | 102012220222 | A1 | 5/2014 | |
| DE | 102014208597 | A1 | 4/2015 | |
| DE | 102014212028 | A1 | 12/2015 | |
| DE | 102015111834 | A1 | 1/2016 | |
| DE | 102016110219 | A1 | 12/2016 | |
| DE | 102016110225 | A1 | 12/2016 | |
| DE | 102015009833 | B3 | 1/2017 | |
| DE | 102015216611 | A1 | 3/2017 | |
| DE | 102017101315 | A1 | 8/2017 | |
| DE | 102016105727 | A1 | 10/2017 | |
| DE | 102017106203 | A1 | 10/2017 | |
| DE | 102017115219 | A1 | 1/2018 | |
| DE | 102017127767 | A1 | 5/2018 | |
| DE | 102018201168 | A1 | 8/2018 | |
| DE | 102017113021 | A1 | 12/2018 | |
| DE | 102017214815 | A1 | 2/2019 | |
| DE | 102018125317 | A1 | 4/2019 | |
| DE | 102018109243 | A1 | 10/2019 | |
| DE | 102020118263 | A1 | 1/2021 | |
| DE | 102020200094 | A1 | 7/2021 | |
| DE | 102020201353 | A1 * | 8/2021 | ............ F16C 35/077 |
| EP | 2725248 | A1 | 4/2014 | |
| EP | 3330493 | A1 | 6/2018 | |
| EP | 3444478 | A1 | 2/2019 | |
| EP | 3512721 | A1 | 7/2019 | |
| EP | 3591363 | A1 | 1/2020 | |
| EP | 3614445 | A1 | 2/2020 | |
| EP | 3730809 | A1 | 10/2020 | |
| EP | 3816466 | A1 | 5/2021 | |
| FI | 123495 | B | 5/2013 | |
| FR | 3055758 | A1 | 3/2018 | |
| JP | 2010216652 | A | 9/2010 | |
| JP | 2010223427 | A | 10/2010 | |
| JP | 2011144927 | A | 7/2011 | |
| JP | 2012122393 | A * | 6/2012 | ............ F16C 17/243 |
| JP | 2012147666 | A | 8/2012 | |
| JP | 2012177462 | A | 9/2012 | |
| JP | 2012207713 | A | 10/2012 | |
| JP | 2015010637 | A | 1/2015 | |
| JP | 2015129736 | A | 7/2015 | |
| JP | 2017003013 | A | 1/2017 | |
| JP | 2018185031 | A | 11/2018 | |
| JP | 2019217609 | A | 12/2019 | |
| JP | 2020063782 | A | 4/2020 | |
| KR | 20110016798 | A | 2/2011 | |
| KR | 20120026335 | A | 3/2012 | |
| KR | 101207075 | B1 | 11/2012 | |
| KR | 20140012866 | A | 2/2014 | |
| KR | 101413249 | B1 | 6/2014 | |
| KR | 20160146104 | A | 12/2016 | |
| KR | 101791969 | B1 | 11/2017 | |
| KR | 20180041495 | A | 4/2018 | |
| KR | 20190129273 | A | 11/2019 | |
| KR | 102058614 | B1 | 1/2020 | |
| KR | 102078182 | B1 | 2/2020 | |
| KR | 102209677 | B1 | 1/2021 | |
| PL | 407976 | A1 | 10/2015 | |
| PL | 227816 | B1 | 1/2018 | |
| RU | 2561429 | C1 | 8/2015 | |
| RU | 2581101 | C1 | 4/2016 | |
| RU | 2648550 | C2 | 3/2018 | |
| RU | 2708409 | C1 | 12/2019 | |
| TW | 201720567 | A | 6/2017 | |
| WO | WO2006051581 | A1 | 5/2006 | |
| WO | WO2007000321 | A1 | 1/2007 | |
| WO | WO2007143623 | A2 | 12/2007 | |
| WO | WO2009131004 | A1 | 10/2009 | |
| WO | WO2013004948 | A1 | 1/2013 | |
| WO | WO2013100944 | A1 | 7/2013 | |
| WO | WO2013176411 | A1 | 11/2013 | |
| WO | WO2016114418 | A1 | 7/2016 | |
| WO | WO2016187837 | A1 | 12/2016 | |
| WO | WO2017025579 | A1 | 2/2017 | |
| WO | WO2018099676 | A1 | 6/2018 | |
| WO | WO2018229987 | A1 | 12/2018 | |
| WO | WO-2019134065 | A1 * | 7/2019 | ............... H02N 2/18 |
| WO | WO2019163566 | A1 | 8/2019 | |
| WO | WO2020105008 | A1 | 5/2020 | |
| WO | WO2020105010 | A1 | 5/2020 | |
| WO | WO-2025003602 | A1 * | 1/2025 | ............. H02N 2/181 |

OTHER PUBLICATIONS

Qiu et al., "Smart functionally graded material without bending deformation," Functionally Graded Materials, 1996, 1 page excerpt.

Wang et al., "Piezoelectirc energy harvesting from pavement," Eco-Efficient Pavement Construction Materials, 2020, 1 page excerpt.

Finio, "Which materials conduct electricity?" <https://www.scientificamerican.com/article/which-materials-conduct-electricity/> article dated Jun. 16, 2016 (9 pages).

Kleckers, "Spoilt for choice: Piezoelectric or strain gauge based force transducers?" <https://www.hbm.com/en/3719/piezoelectric-or-strain-gauge-based-force-transducers/> web page visited Aug. 2, 2024 (5 pages).

Nanomotion, "The piezoelectric effect," <https://www.nanomotion.com/nanomotion-technology/piezoelectric-effect/#:~:text=Some%20naturally%20piezoelectric%20occurring%20materials,to%20act%20a s%20a%20biological> web page visited Aug. 2, 2024 (6 pages).

Walden, "How coupling types affect bearing forces," <https://www.machinedesign.com/motors-drives/article/21826411/how-coupling-types-affect-bearing-forces> article dated Oct. 1, 2000 (9 pages).

Mao, "Study on the load distribution and dynamic characteristics of a thin-walled integrated squirrel-cage supporting roller bearing," Applied Sciences, 2016, 6(12), 11 pages.

Saleh et al., "30 years of functionally graded materials: An overview of manufacturing methods, applications, and future challenges," Composites Part B, 2020, 201, 46 pages.

Zhou et al., "Optimal design of functionally graded material for stress concentration reduction," Structures, 2021, 29, pp. 561-569.

* cited by examiner

BEARING COMPONENT WITH PIEZOELECTRIC CORE

CROSS-REFERENCE TO RELATED APPLICATION

This patent application claims priority and benefit of the filing date of U.S. Provisional Patent Application Ser. No. 63/314,165 filed Feb. 25, 2022, the disclosure and contents of which are expressly incorporated herein in its entirety by reference.

BACKGROUND

The present embodiments relate to mechanical waste energy harvesting by a mechanical bearing assembly including a bearing component Various applications of mechanical waste energy harvesting have been developed in recent years in order to convert energy lost in power transmission systems into a usable form. In a mechanical bearing assembly, torsional loading strains and friction losses can cause wear on a bearing component and reduce the overall power transmission efficiency of a mechanical system.

Piezoelectric materials, such as quartz, can be utilized to convert a mechanical deflection of a material into an electrical potential (i.e. the principle employed to create a strain gage).

SUMMARY

An ideal approach to an energy harvesting system is to utilize an internal piezoelectric core with an attached electrical storage device in an attempt to create usable additional electrical power from wasted mechanical energy. The present arrangements contemplate energy harvesting arrangements for efficiently harvesting energy from a bearing component.

One embodiment is directed to a bearing component having an internal core of piezoelectric material for harvesting of mechanical energy. The bearing component comprises: the internal core of piezoelectric material extending circumferentially about an entirety of the bearing component; an insulating layer surrounding the internal core of piezoelectric material; and an external shell surrounding the insulating layer and enclosing the internal core of piezoelectric material and the insulating layer.

Another embodiment is directed to the bearing component including a p-type material and an n-type material contacting opposing portions of the internal core of piezoelectric material to act as an internal power generation mechanism that is isolated from the external shell of the bearing component by the insulating layer. The bearing component includes a power storage device having a respective positive terminal connected by a first lead to the p-type material and a respective negative terminal connected by a second lead to the n-type material disposed in the bearing component, wherein the power storage device receives power generated by torsional loading applied to the bearing component.

In another embodiment, the bearing component includes: an inner alpha layer surrounding the internal core of piezoelectric material; a beta layer surrounding the inner alpha layer; and a gamma layer surrounding the beta layer and in contact with the insulating layer. The alpha layer, the beta layer, and the gamma layer include materials that linearly or exponentially increase or decrease in strength and/or ductility extending in succession from the internal core of piezoelectric material to the insulating layer and the external shell.

In another embodiment, the bearing component for harvesting mechanical energy includes: a piezoelectric element embedded in conductive ductile material, a p-type material and a n-type material contacting opposing portions of the conductive ductile material enclosing the piezoelectric element to act as an internal power generation mechanism, an insulating layer enclosing the piezoelectric element embedded in the conductive ductile material, the p-type material, and the n-type material; and an external shell surrounding the insulating layer and enclosing the piezoelectric element embedded in the conductive ductile material, the p-type material, the n-type material and the insulating layer.

In another embodiment, the bearing component for harvesting mechanical energy includes: a first internal core disposed in a first center location that extends the bearing component, a first p-type material and a first n-type material contacting opposing portions of the first internal core to act as a first internal power generation mechanism. The bearing component further includes a second internal core disposed in a second center location that extends about the bearing component, a second p-type material and a second n-type material contacting opposing portions of the second internal core to act as a second internal power generation mechanism. A separation layer separates the first internal core, the first p-type material and the first n-type material from the second internal core, the second p-type material, and the second n-type material, an insulating layer encloses the first internal core, the first p-type material, the first n-type material, the second internal core, the second p-type material, and the second n-type material, and an external shell surrounds the insulating layer and encloses the first internal core, the first p-type material, the first n-type material, the second internal core, the second p-type material, and the second n-type material.

Other aspects will become apparent by consideration of the detailed description and accompanying drawings.

DETAILED DESCRIPTION

Before any embodiments are explained in detail, it is to be understood that the arrangement is not limited in its application to the details of construction and the arrangement of components set forth in the following description or illustrated in the following drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported." and "coupled" and variations thereof are used broadly and encompass both direct and indirect mountings, connections, supports, and couplings. Further, "connected" and "coupled" are not restricted to physical or mechanical connections or couplings.

As should also be apparent to one of ordinary skill in the art, the systems shown in the figures are models of what actual systems might be like. Thus, the claims should not be limited to the specific examples or terminology or to any specific hardware implementation.

Figure 1:
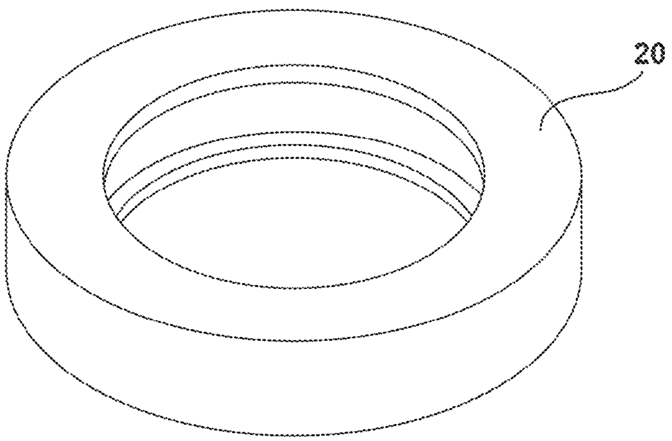
FIG. 1 illustrates an isometric view of a bearing component.
Figure 2:
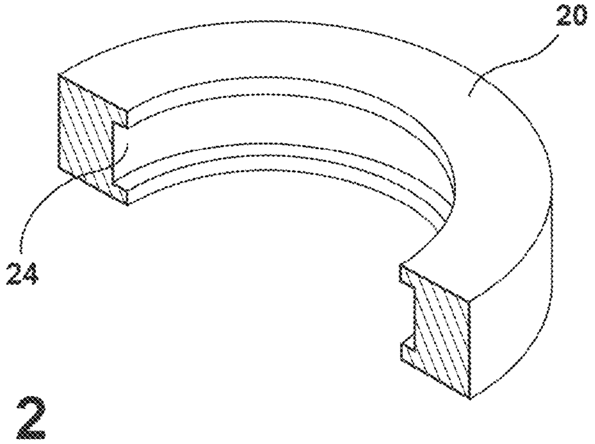
FIG. 2 shows a cross sectional view of the bearing component shown FIG. 1.

FIG. 1 illustrates a bearing component 20 (i.e. an outer ring) for receiving rolling elements and receiving an internal race (not shown). FIG. 2 shows a cross-section of the bearing component 20 having an inner channel or raceway 24 for receiving rolling elements.

Figure 3:
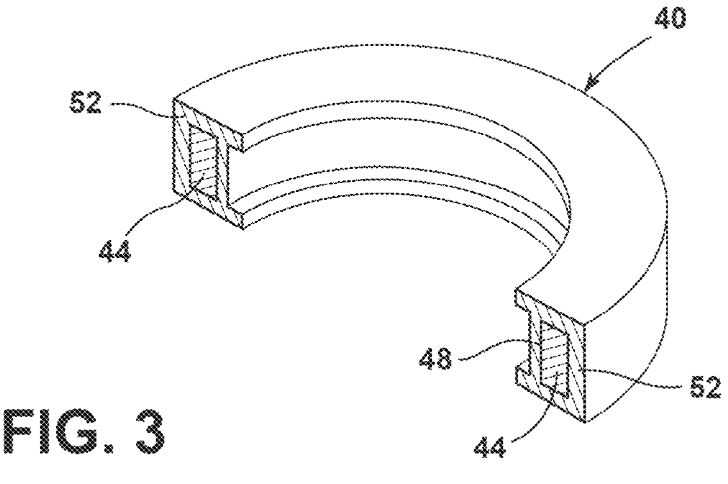
FIG. 3 shows a cross sectional view including an internal structure of a piezoelectric bearing component.
Figure 4:
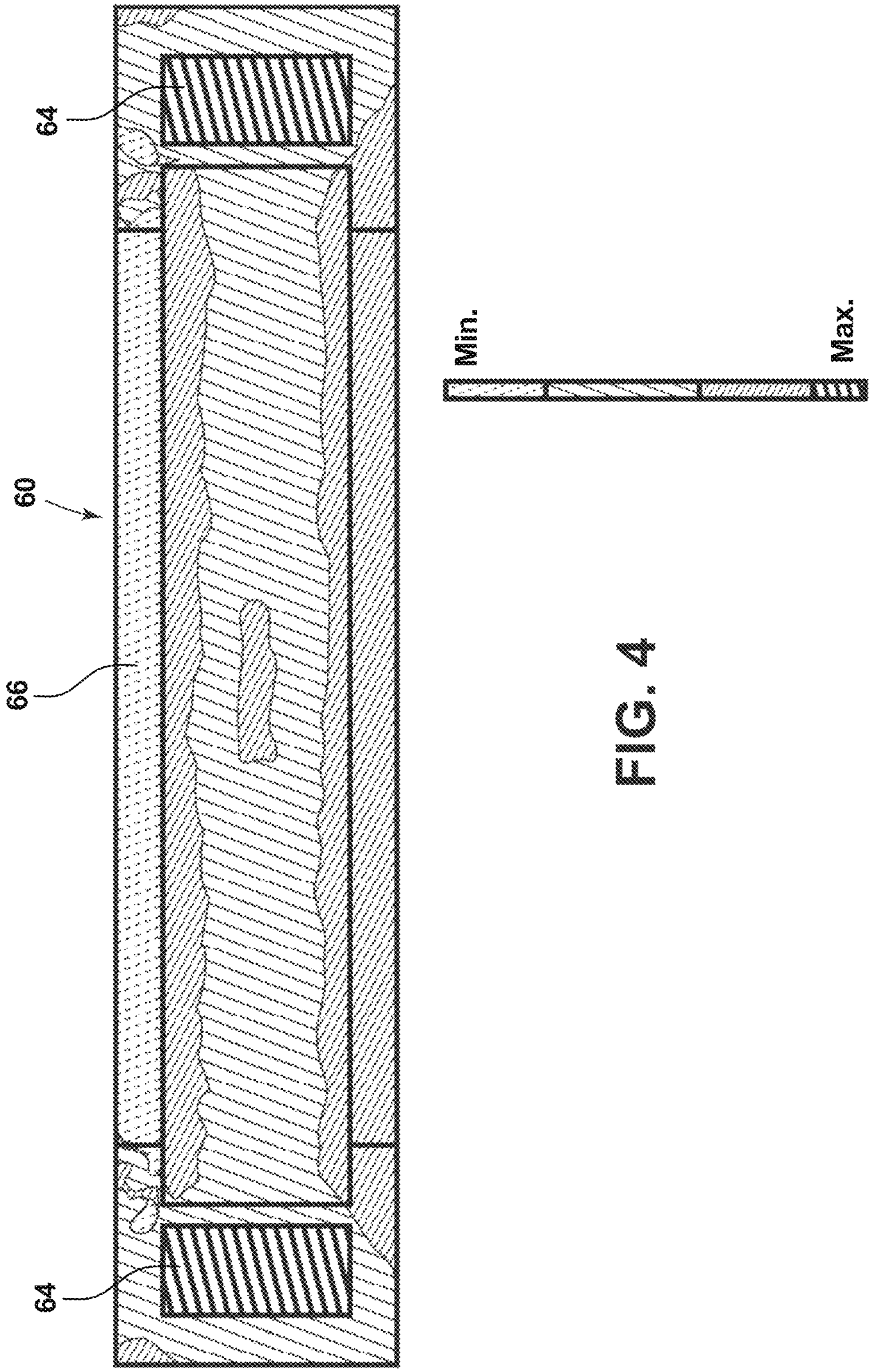
FIG. 4 shows a cross sectional view of a finite element analysis for the piezoelectric bearing component of FIG. 3.

FIG. 3 illustrates a cross sectional view of a bearing component 40 having an internal core of piezoelectric material 44 extending circumferentially about the bearing component 40. In the illustrated embodiment, the material extends about an entirety of the bearing component 40. An insulating layer 48 surrounds the piezoelectric material 44 to provide insulation from an external shell or body 52 of the bearing component 40. In one embodiment, the bearing component 40 is a generally cylindrical outer bearing component or outer ring. FIG. 4 shows finite element analysis 60 for the bearing component 40 showing that a region of the piezoelectric material 44 has maximized strain distribution during use thereof. Another region 66 has a least amount of strain distribution according to finite element analysis. A graph of minimum and maximum strain values is shown at lower right of FIG. 4.

Further information on the operation of the bearing component 40 is disclosed in the operation for the embodiment set forth below.

Embodiment 2

Figure 5:
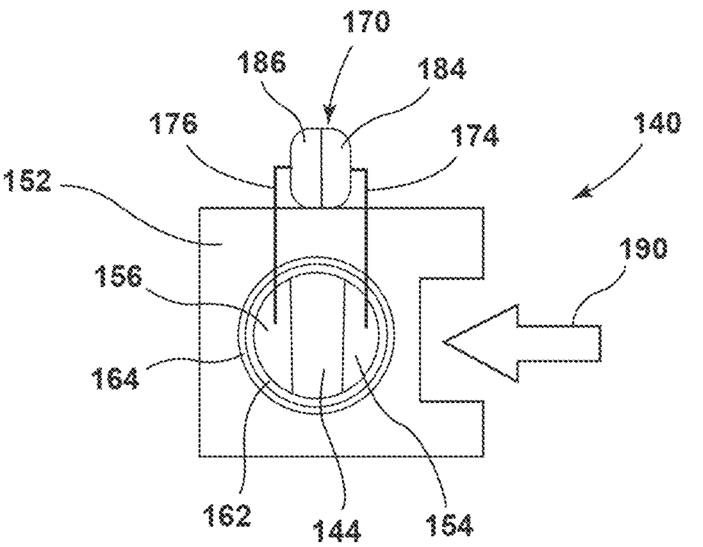
FIG. 5 illustrates a cross sectional view of another embodiment of a piezoelectric bearing component.

FIG. 5 shows a cross sectional view of one section of another bearing component 140 providing an energy harvesting concept from a functionality point of view. Specifically, in one embodiment, the bearing component 140 is a ring shaped outer ring/race and the working system also could be potentially applied to an inner bearing component as well if the energy storage device is properly secured or coupled to the face of a spinning ring shaped inner bearing component (i.e. inner race). FIG. 5 shows an internal core 144 of piezoelectric material embedded in the center of the bearing component 140 and flanked on either end by materials with electric potential: a p-type material 154 creates a positive voltage end and an n-type material 156 creates a negative voltage end (in a similar fashion to that of a diode). The materials 154, 156 act as an internal power generation mechanism that can then be isolated from an external shell or body 152 of the bearing component 140 by adding an electrically resistive layer to the insulating layer 162 (to prevent shock); which is itself surrounded by a thermally resistive layer 164 to allow for the external shell or body 152 to be cast around the internal elements and layers 154, 156, 162, 164. A power storage device 170 has leads 174, 176 with a respective positive terminal 184 connected by the first lead 174 to the p-type material 154 and a respective negative terminal 186 connected by the second lead 176 to the n-type material 156 disposed in the bearing component 140. In one embodiment, orientating the p-type material 154 to receive the force of the torsional loading shown by arrow 190 in FIG. 5 creates a standard voltage (positive to negative energy flow). In another embodiment, a reversal of the polarities demonstrated in FIG. 5 (n-type material against a bearing roller path) creates a "negative" voltage (such as that found in a JFET transistor). The p-type material usually includes a silicon wafer doped with boron, which has one less electron than silicon (making the material positively charged). An n-type material is usually doped with phosphorus, which has one more electron than silicon (making the material negatively charged).

In one embodiment, the p-type material 154 and the n-type material 156 contact opposing portions of the internal core 144 of piezoelectric material to act as an internal power generation mechanism that is isolated from the external shell 152 of the bearing component 140 by the insulating layers 162, 164.

In operation, the p-type material 154 and n-type material 156 contact opposing portions of the internal core 144 of piezoelectric material to act as an internal power generation mechanism that is isolated from the external shell or body 152 of the bearing component 140 by the insulating layers 162, 164.

Embodiment 3

Figure 6:
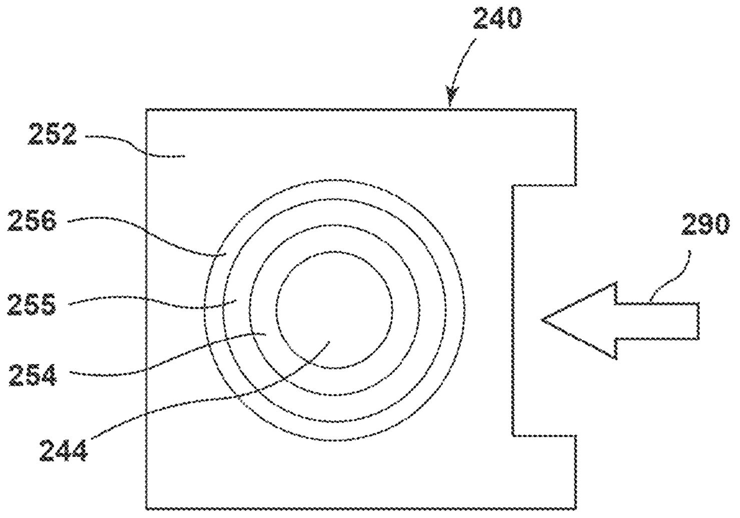
FIG. 6 illustrates a cross sectional view of yet another embodiment of a piezoelectric bearing component.

FIG. 6 shows a cross sectional view of one section of another bearing component 240 providing an energy harvesting of mechanical energy concept from a functionality point of view. Specifically, in one embodiment the bearing component 240 is an outer ring shaped outer race and the working system also could be potentially applied to an inner ring/race bearing component as well if an energy storage device is properly secured to the face of a spinning ring shaped inner bearing component (i.e. inner race). For example, in FIG. 6, the internal core of piezoelectric material 244, (simplified as a single circle to retain clarity) is provided within the bearing component 240 having an external shell or body 252. FIG. 6 also shows that an internal force/strain redistribution methodology could be extended to include multiple layers of progressively varying strength or ductility. More specifically, the internal core 244 of piezoelectric material is surrounded by an inner annular alpha layer 254, an outwardly oriented circular or annular shaped cross section of a beta layer 255, and finally an annular shaped gamma layer 256 which include materials that linearly or exponentially increase or decrease in strength and/or ductility (or other variable material properties) as they are added in succession from inside/adjacent the internal core 244 of piezoelectric material to outside adjacent the external shell 252. In one embodiment, the alpha layer 254 is 4340 steel alloy at 190 Gigapascal (GPa) at 25 degrees Celsius, the beta layer 255 is 4340 steel alloy at 195 Gigapascal (Gpa) at 25 degrees Celsius, and the gamma layer 256 is 4340 steel alloy at 205 Gpa at 25 degrees Celsius. This arrangement including the alpha layer 254, the beta layer 255, and the gamma layer 256, in combination, optimize the distribution of stress/strain felt inside a bearing ring formed by the outer or external bearing component 240 to maximize energy harvesting potential and reduce the risk of failure due to the increase of stress concentrations found in composite material at material intersection points. A power storage device, terminals, an electrically resistive layer, and a thermally resistive layer are provided in some embodiments. In one embodiment, the gamma layer 256 acts as a thermally resistive layer and an electrically resistive layer. In another embodiment, an electrically resistive layer and a thermally resistive layer (not shown) are provided between the gamma layer 256 and the external shell or body 252 of the bearing component 240. FIG. 6 shows a direction for torsional loading 290 similar to the direction for the arrangement shown in FIG. 5.

In one embodiment, the alpha layer 254, the beta layer 255, and the gamma layer 256 optimize the distribution of stress/strain sensed inside the internal core 244 of piezoelectric material or a piezoelectric element within the bearing component 240 to maximize energy harvesting potential and reduce the risk of failure due to the increase of stress concentrations found in composite materials at material intersection points. While three layers are shown, other embodiments have 3 to n layers, wherein n represents a maximum value of 8 or more layers in total.

In another embodiment, the alpha layer 254 is 4340 steel alloy at a Rockwell hardness scale (HRC) of 54, the beta layer 255 is 440C steel alloy at HRC 58, and the gamma layer 256 is M50 steel alloy at HRC 63. Again, other embodiments have from 2 to n layers of different materials.

Embodiment 4

Figure 7:
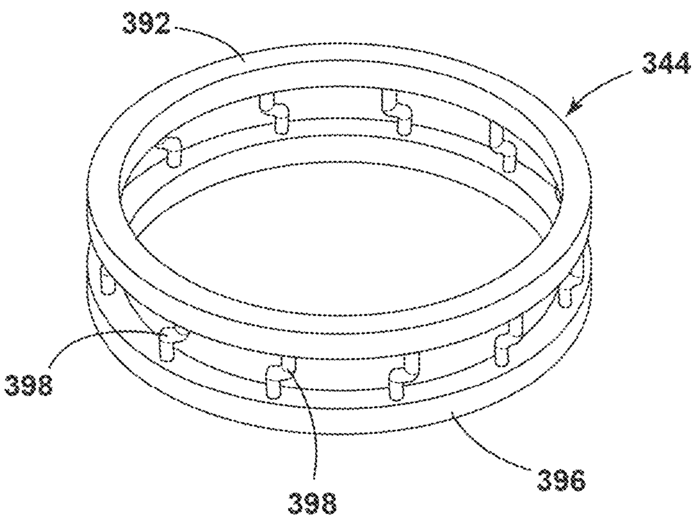
FIG. 7 illustrates a perspective view of an internal structure or piezoelectric element for another embodiment of a bearing component.

FIG. 7 extends the concept of the internal core of piezoelectric material to a geometry that considers alternate shapes and structures that have beneficial reactions to the torsional loading occurring on the outside of the ring for the bearing component. The example of an internal core 344 of piezoelectric material shown in FIG. 7 mimics the helical structure of DNA so that the element is capable of twisting in reaction to torsional loading and further resist fracture. The internal core 344 of piezoelectric material includes a circular or annular shaped first or upper piezoelectric member 392 and a spaced circular or annular shaped second or lower piezoelectric member 396 as shown in FIG. 7. Further, angled piezoelectric connecting elements 398 are provided about the piezoelectric members 392, 396, connecting same with each other. In one embodiment, the angled piezoelectric connecting elements 398 are provided with a first upwardly projecting leg projecting upwardly from the piezoelectric member 396, a second sidewardly projecting or transverse leg and a third upwardly projecting leg that joins to the piezoelectric member 392. The piezoelectric members 392, 396 are spaced apart essentially equidistantly from each other in a shared plane. The angled piezoelectric connecting elements 398 are provided about and connect the annular shaped upper piezoelectric member 392 and the annular shaped lower piezoelectric member 396. The piezoelectric members 392, 396, 398 are embedded in conductive ductile material (not shown) to form the internal core 344 in one embodiment. Thus, the piezoelectric members 392, 396 define two spaced piezoelectric core members. In another embodiment, the internal core 344 of piezoelectric material is surrounded by an insulating layer and encased within an external shell or body of a bearing component.

The internal core 344 of piezoelectric material can be utilized in conjunction with the methodology demonstrated in FIGS. 5 and 6, and may potentially be utilized in conjunction with the methodology shown in FIG. 3 as well. The layering effect would be cast around the internal core shape of the bearing component and a power storage device is soldiered into the ring shaped bearing component. In one embodiment, the helical shape of the internal core 344 of piezoelectric material is cast sideways inside a ring of ductile steel alloy that is placed between a P-N junction.

One of skill in the art will understand that with any of the disclosed embodiments a "layer" can have a wide range of thicknesses and shapes. While circular or annular shapes are shown for the layers in FIG. 6, oval and other shapes are contemplated.

Embodiment 5

Figure 8:
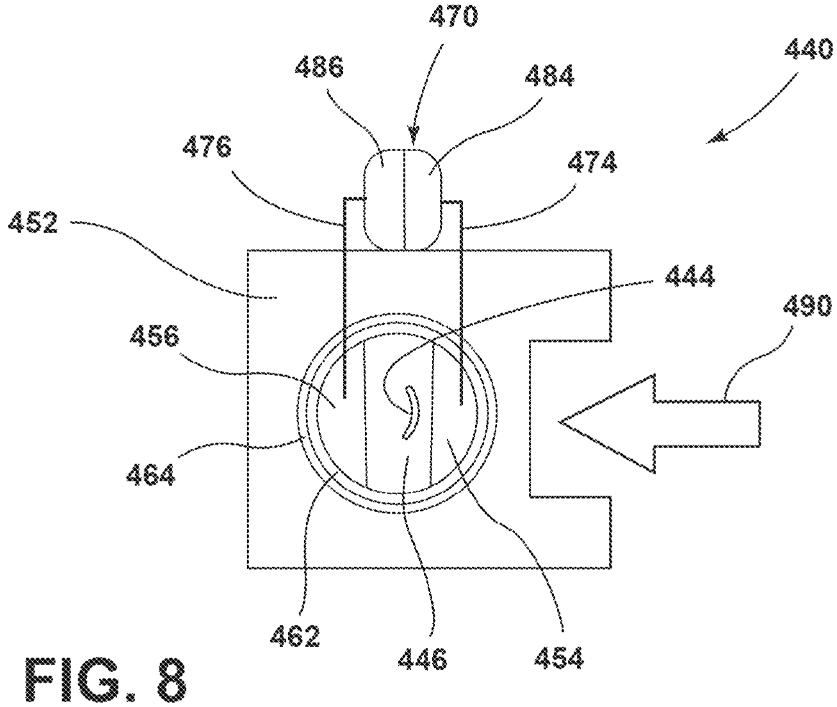
FIG. 8 illustrates a cross sectional view of another embodiment of a piezoelectric bearing component.

FIG. 8 shows a cross sectional view of one section of another bearing component 440 providing an energy harvesting concept from a functionality point of view. Specifically, in one embodiment, the bearing component 440 is a ring shaped outer ring/race and the working system also could be potentially applied to an inner bearing component as well if the energy storage device is properly secured or coupled to the face of a spinning ring shaped inner bearing component (i.e. inner race). FIG. 8 shows embedded braids or a helical shaped piezoelectric structure 444 of piezoelectric material embedded or cast in ductile conductive metal or other material 446 forming a central core structure for the bearing component 440. The conductive ductile core material 446 enclosing the helical shaped piezoelectric structure 444 is flanked on either end by materials with electric potential: a p-type material 454 creates a positive voltage end and an n-type material 456 creates a negative voltage end (in a similar fashion to that of a diode). The materials 454, 456 act as an internal power generation mechanism that can then be isolated from an external shell or body 452 of the external bearing component 440 by adding an electrically resistive layer or insulating layer 462 (to prevent shock); which is itself surrounded by a thermally resistive layer 464 to allow for the external shell or body 452 to be cast around the internal elements and layers 444, 446, 454, 456, 462, 464. A power storage device 470 has leads 474, 476 with a respective positive terminal 484 connected by the first lead 474 to the p-type material 454 and a respective negative terminal 486 connected by the second lead 476 to the n-type material 456 disposed in the bearing component 440. In one embodiment, orientating the p-type material 454 to receive the force of the torsional loading shown by arrow 490 in FIG. 8 creates a standard voltage (positive to negative energy flow). In another embodiment, a reversal of the polarities demonstrated in FIG. 8 (n-type material against a bearing roller path) creates a "negative" voltage (such as that found in a JFET transistor). The p-type material usually includes a silicon wafer doped with boron, which has one less electron than silicon (making the material positively charged). An n-type material is usually doped with phosphorus, which has one more electron than silicon (making the material negatively charged).

In one embodiment, the p-type material 454 and the n-type material 456 contact opposing portions of the conductive ductile core material 446 encapsulating a helical shaped piezoelectric structure 444 to act as an internal power generation mechanism that is isolated from the external shell 452 of the bearing component 440 by the insulating layers 462, 464.

Figure 9:
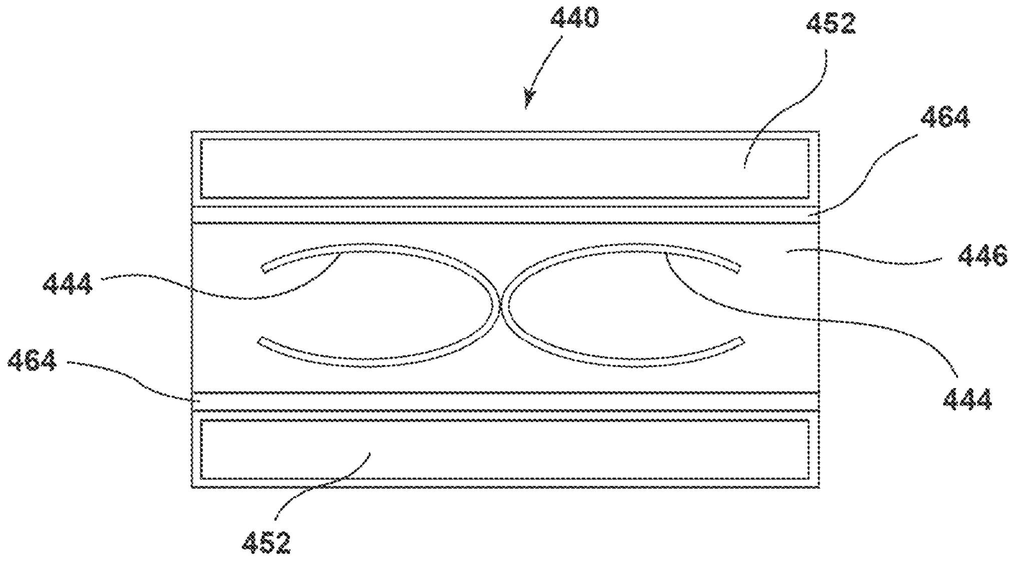
FIG. 9 shows a cross sectional view of the FIG. 8 piezoelectric bearing component that is transverse to the view shown in FIG. 8.
Figure 10:
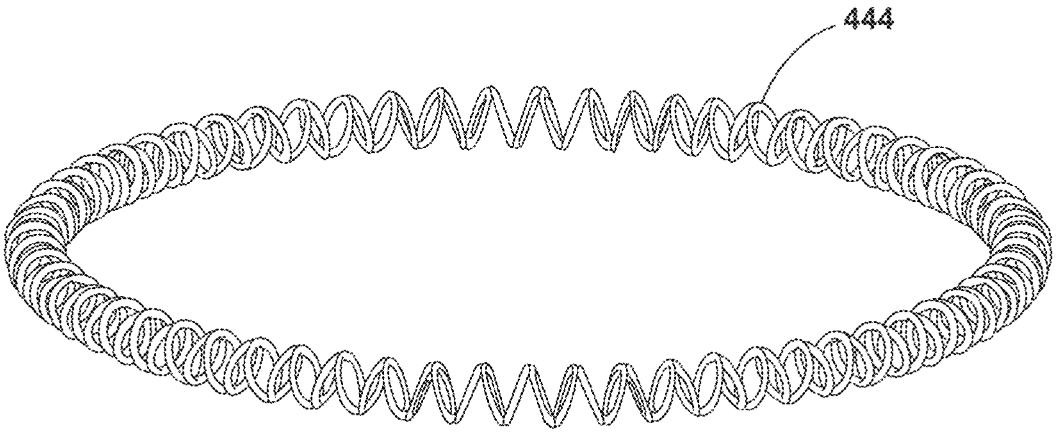
FIG. 10 shows a perspective view of one embodiment for the braids or helical shaped piezoelectric structure shown in FIGS. 8 and 9.

FIG. 9 shows a cross sectional view of the FIG. 8 external bearing component 440 wherein the view is transverse to the FIG. 8 cross sectional view. The helical shape of the braids or helical shaped piezoelectric structure 444 is shown in FIG. 9 that is casted in the conductive ductile core material 446 to form the bearing component 440. Further, FIG. 10 shows an isometric view of the braids defining a helical shaped piezoelectric structure 444. The helical shaped piezoelectric structure 444 shown in FIG. 10 is embedded in the conductive ductile core material 446 shown in FIG. 8.

Figure 11:
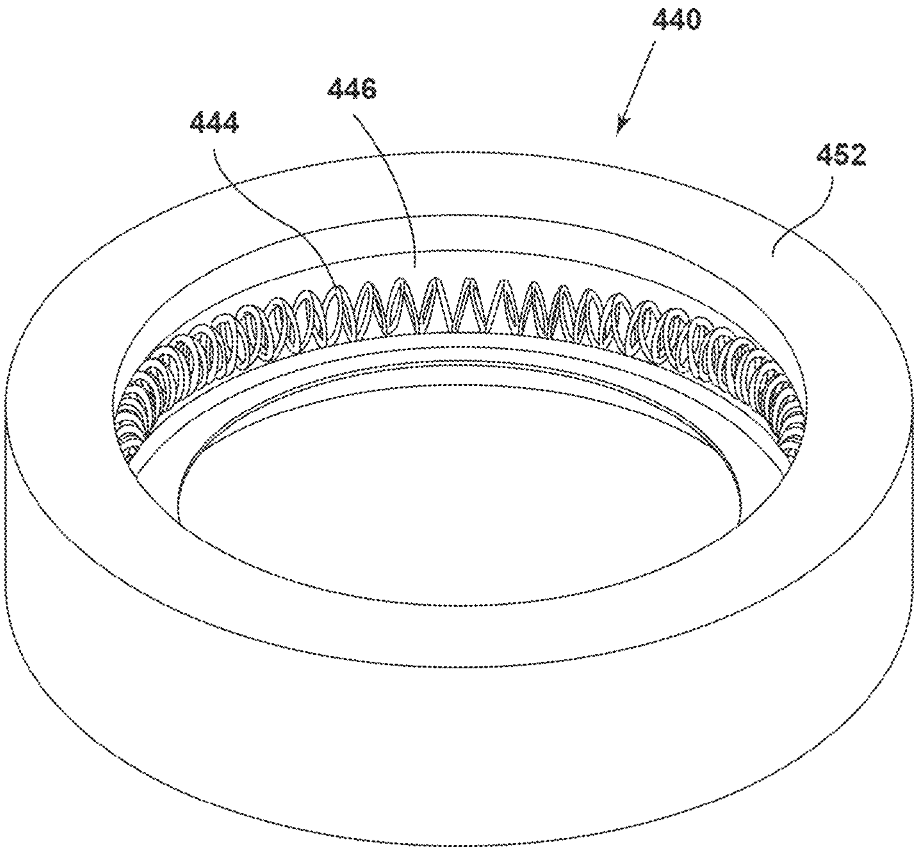
FIG. 11 shows a cut-away perspective view of the piezoelectric bearing component of FIG. 8.
Figure 12:
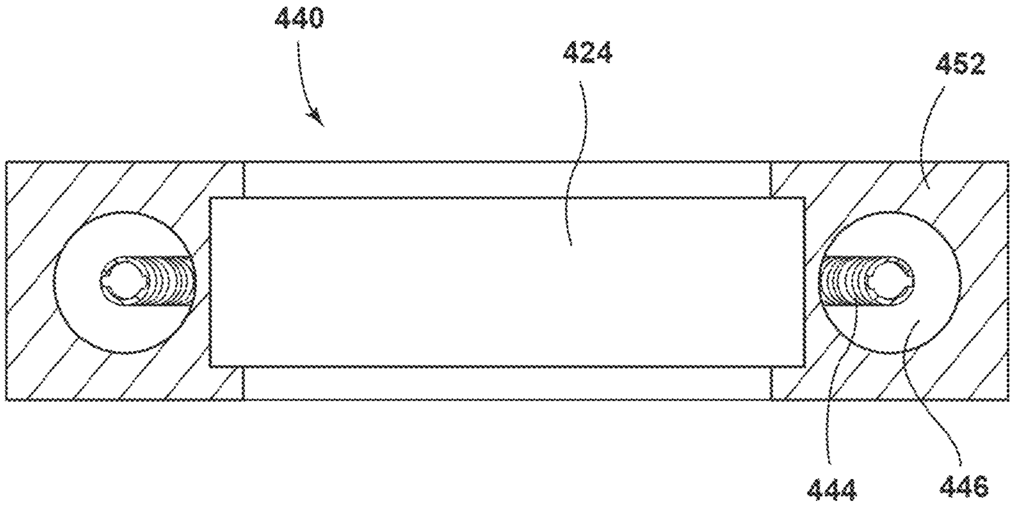
FIG. 12 shows a cross-sectional view of the piezoelectric bearing component of FIG. 11.

FIG. 11 is a perspective view of a bearing component 440 of the arrangement shown in FIG. 8 without the P-N junction shown. The bearing component 440 includes a conductive ductile core material 446 cut away partially to expose the helical shaped piezoelectric structure 444. The external shell or body 452 is also shown for the bearing component 440. FIG. 12 is a cross-sectional view of the FIG. 11 structure showing a bearing component 440 having the conductive ductile core material 446 surrounding the helical shaped piezoelectric structure 444 and within the external shell or body 452. An inner face of an inner channel or raceway 424 is also illustrated in FIG. 12.

Embodiment 6

Figure 13:
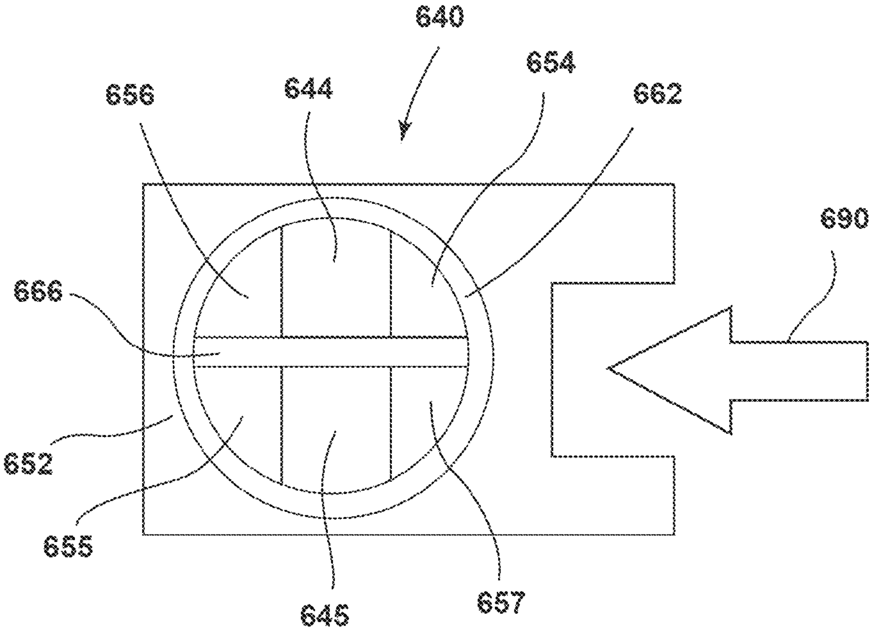
FIG. 13 shows a cross section view of yet another embodiment of a piezoelectric bearing component.

FIG. 13 shows a cross sectional view of one section of another bearing component 640 providing an energy harvesting concept from a functionality point of view. Specifically, in this embodiment, the bearing component 640 is a ring shaped outer ring/race and the working system also could be potentially applied to an inner bearing component as well if the energy storage device is properly secured or coupled to the face of a spinning ring shaped inner bearing component (i.e. inner race). FIG. 13 shows a first or upper internal core 644 of piezoelectric material that in one embodiment includes a first or upper piezoelectric element embedded in conductive ductile material in one embodiment. In another embodiment the first internal core 644 is piezoelectric material. The first or upper internal core 644 is disposed in a first or upper center location of the bearing component 640 that extends about an entirety of the bearing component. A second or lower internal core 645 of piezoelectric material includes a second or lower piezoelectric element embedded in conductive ductile material in the one embodiment. In another embodiment, the second internal core is essentially entirely piezoelectric material. The second or lower internal core 645 is disposed at a second spaced or lower center location of the bearing component 640 and extends about an entirety of the bearing component in one embodiment. The first internal core 644 is disposed spaced above the second internal core 645. The first or upper internal core 644 is flanked on either end or side by materials with electric potential: a first or upper p-type material 654 creates a positive voltage end and an upper or first n-type material 656 creates a negative voltage end (in a similar fashion to that of a diode). The first or upper p-type material 654 and the first or upper n-type material 656 contact opposing portions of the first or upper internal core 644 to act as a first internal power generation mechanism. Likewise, the second or lower internal core 645 including piezoelectric element embedded in ductile material is flanked on either end or side by materials with electric potential: a second or lower p-type material 655 creates a positive voltage end and a second or lower n-type material 657 creates a negative voltage end (in a similar fashion to that of a diode). The first or upper internal core 644, the first or upper p-type material 654, and the first or upper n-type material 656 are separated from the second or lower internal core 645, the second or lower p-type material 655, and the second or lower n-type material 657 by a planar separation layer 666. The planar separation layer 666 insulates the voltages generated and the materials from each other. The separation layer 666 is disposed for separating the first or upper internal core 644, the first or upper p-type material 654 and the first or upper n-type material 656 from the second or lower internal core 645, the second or lower p-type material 655, and the second or lower n-type material 657. As in earlier embodiments, an insulation layer 662 surrounds the entirety of the first or upper materials 644, 654, 656 and the entirety of the second or lower materials 645, 655, 657 to isolate from an external shell or body 652 of the bearing component 640 to prevent shock. In some embodiments, the insulation layer 662 is itself surrounded by an additional thermally resistive layer to allow for the external shell or body 652 to be cast around the first or upper materials and the second or lower materials. In FIG. 13, the first or upper n-type material 656 is separated from the adjacent second or lower p-type material 655 by the separation layer 666. The first p-type material 654 is separated from the adjacent second or lower n-type material 657 by the separation layer 666.

A power storage device (not shown) has leads (not shown) with a respective positive terminal (not shown) connected by the first lead to the first or upper p-type material 654 and a respective negative terminal connected by the second lead to the first or upper n-type material 656 disposed in an upper portion of the bearing component 640 to act as a first internal power generation mechanism. Another pair of terminals are connected by leads to the second or lower p-type material 655 and the second or lower n-type material 657 disposed in a lower portion of the bearing component 640 shown in FIG. 13 to act as a second internal power generation mechanism.

The result shown in FIG. 13 is two P/N style terminals electrically insulated from one another and insulated from each other in the bearing component 640 to allow for two distinct generated voltages. Thus, the mechanical input force of the torsion loading 690 on the bearing component 640 is essentially reduced by one half in the arrangement shown in FIG. 13. The wave output by the piezoelectric voltages generated can be alternating current, but wave modulation circuits are provided in some embodiments so that the voltage output is provided to a user's specifications as needed. Several operational amplifier and digital logic applications utilize positive and negative voltage inputs provided thereto.

In one embodiment, orientating the p-type material 154 to receive the force of the torsional loading shown by arrow 190 in FIG. 5 creates a standard voltage (positive to negative energy flow). In another embodiment, a reversal of the polarities demonstrated in FIG. 5 (n-type material against a bearing roller path) creates a "negative" voltage (such as that found in a JFET transistor). The p-type material usually includes a silicon wafer doped with boron, which has one less electron than silicon (making the material positively charged). An n-type material is usually doped with phosphorus, which has one more electron than silicon (making the material negatively charged). These materials may be utilized with all of the disclosed embodiments.

In one embodiment, the p-type material 154 and the n-type material 156 contact opposing portions of the internal core 144 of piezoelectric material to act as an internal power generation mechanism that is isolated from the external shell 152 of the bearing component 140 by the insulating layers 162, 164. Other embodiments may have similar arrangements.

The term internal core of piezoelectric material is defined both as a solid core of piezoelectric material and a internal core formed by a piezoelectric element as shown in FIGS. 7-11 that is surrounded by ductile material. Elements, such as the piezoelectric element utilized in one embodiment, may also be utilized for an internal core of piezoelectric material for another embodiment disclosed herein.

While FIG. 8 shows a helical shaped piezoelectric structure 444 embedded in ductile material 446, in another embodiment, the combination is replaced by a solid piezoelectric element.

While the internal cores 644, 645 are described as including a piezoelectric element embedded in a conductive ductile material, the cores may also represent a solid piezoelectric element in any other arrangements disclosed herein.

Various features and advantages of the arrangement are set forth in the following claims.

What is claimed is:

1. A bearing component having an internal core of piezoelectric material for harvesting mechanical energy, the bearing component comprising:
- the internal core of piezoelectric material extending circumferentially about an entirety of the bearing component;
- an insulating layer surrounding the internal core of piezoelectric material; and
- an external shell surrounding the insulating layer and enclosing the internal core of piezoelectric material and the insulating layer.

2. The bearing component of claim 1, wherein the insulating layer includes an electrically resistive layer and a thermally resistive layer.

3. The bearing component of claim 1, including a p-type material and an n-type material contacting opposing portions of the internal core of piezoelectric material to act as an internal power generation mechanism that is isolated from the external shell of the bearing component by the insulating layer.

4. The bearing component of claim 3, including a power storage device having a respective positive terminal connected by a first lead to the p-type material and a respective negative terminal connected by a second lead to the n-type material disposed in the bearing component, wherein the power storage device receives power generated by torsional loading applied to the bearing component.

5. The bearing component of claim 1, wherein the bearing component includes:
- an inner alpha layer surrounding the internal core of piezoelectric material,
- a beta layer surrounding the inner alpha layer, and
- a gamma layer surrounding the beta layer and in contact with the insulating layer,
- wherein the alpha layer, the beta layer, and the gamma layer include materials that linearly or exponentially increase or decrease in strength and/or ductility extending in succession from the internal core of piezoelectric material to the insulating layer and the external shell.

6. The bearing component of claim 1, wherein the internal core of piezoelectric material includes an annular shaped first piezoelectric member and a spaced annular shaped second piezoelectric member.

7. The bearing component of claim 6, including angled piezoelectric connecting elements provided about and connecting the annular shaped first piezoelectric member and the annular shaped second piezoelectric member.

8. The bearing component of claim 1, wherein the bearing component includes an inner channel, and wherein torsional loading is applied to the inner channel by rolling elements for the harvesting of the mechanical energy.

9. The bearing component of claim 1, wherein the bearing component is a cylindrical outer bearing component.

10. The bearing component of claim 1, wherein the internal core of piezoelectric material includes embedded braids or a helical shaped piezoelectric structure disposed within a conductive ductile material.

11. A bearing component for harvesting mechanical energy, the bearing component comprising:
- a piezoelectric element embedded in conductive ductile material,
- a p-type material and a n-type material contacting opposing portions of the conductive ductile material enclosing the piezoelectric element to act as an internal power generation mechanism,
- an insulating layer enclosing the piezoelectric element embedded in the conductive ductile material, the p-type material, and the n-type material; and
- an external shell surrounding the insulating layer and enclosing the piezoelectric element embedded in the conductive ductile material, the p-type material, the n-type material and the insulating layer.

12. The bearing component according to claim 11, wherein the piezoelectric element embedded in the conductive ductile material extends circumferentially about an entirety of the bearing component.

13. The bearing component according to claim 12, including a power storage device having a respective positive terminal connected by a first lead to the p-type material and a respective negative terminal connected by a second lead to the n-type material disposed in the bearing component, wherein the power storage device receives power generated by torsional loading applied to the bearing component.

14. The bearing component according to claim 11, wherein the bearing component is a ring shaped bearing component and the piezoelectric element embedded in the conductive ductile material extends about an entirety of the ring shaped bearing component.

15. The bearing component according to claim 11, wherein the bearing component includes an inner channel, and wherein torsional loading is applied to the inner channel by rolling elements for the harvesting of the mechanical energy.

16. A bearing component for harvesting mechanical energy, the bearing component comprising:
- a first internal core disposed in a first center location that extends about the bearing component,
- a first p-type material and a first n-type material contacting opposing portions of the first internal core to act as a first internal power generation mechanism,
- a second internal core disposed in a second center location that extends about the bearing component,
- a second p-type material and a second n-type material contacting opposing portions of the second internal core to act as a second internal power generation mechanism,
- a separation layer separating the first internal core, the first p-type material and the first n-type material from the second internal core, the second p-type material, and the second n-type material, an insulating layer enclosing the first internal core, the first p-type material, the first n-type material, the second internal core, the second p-type material, and the second n-type material, and an external shell surrounding the insulating layer and enclosing the first internal core, the first p-type material, the first n-type material, the second internal core, the second p-type material, and the second n-type material.

17. The bearing component of claim 16, wherein the first internal core includes a first piezoelectric element embedded in a conductive ductile material, and wherein the second internal core includes a second piezoelectric element embedded in a conductive ductile material.

18. The bearing component of claim 17, wherein the first internal core disposed at the first center location is disposed above the second internal core.

19. The bearing component claim 17, wherein the first piezoelectric element embedded in the conductive ductile material includes embedded braids or a helical shaped piezoelectric structure.

20. The bearing component of claim 16, including a power storage device having a respective positive terminal connected by a first lead to the first p-type material and a respective negative terminal connected by a second lead to the first n-type material disposed in the bearing component, wherein the power storage device receives power generated by torsional loading applied to the bearing component.

21. The bearing component of claim 20, wherein the bearing component is a ring shaped bearing component with an inner channel, and wherein torsional loading is applied to the inner channel by rolling elements for the harvesting of the mechanical energy.

22. The bearing component of claim 16, wherein the first p-type material is separated from the adjacent second n-type material by the separation layer.

* * * * *